Figure 1:
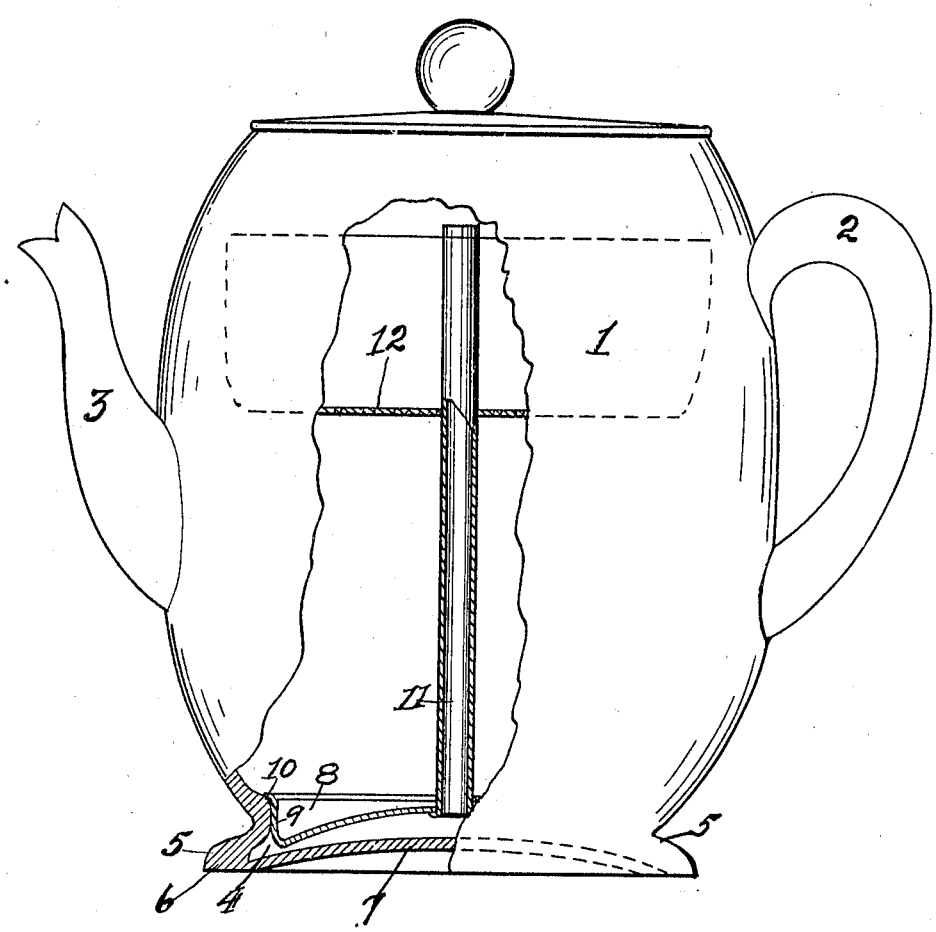

H. C. JOHNSON.
COFFEE PERCOLATOR.
APPLICATION FILED JULY 25, 1907. RENEWED AUG. 19, 1910.

988,470.

Patented Apr. 4, 1911.

2 SHEETS—SHEET 1.

WITNESSES:
H. M. Swift.
A. Nelson.

INVENTOR
Harold C. Johnson
BY
Harry Lea Dodson
ATTORNEY

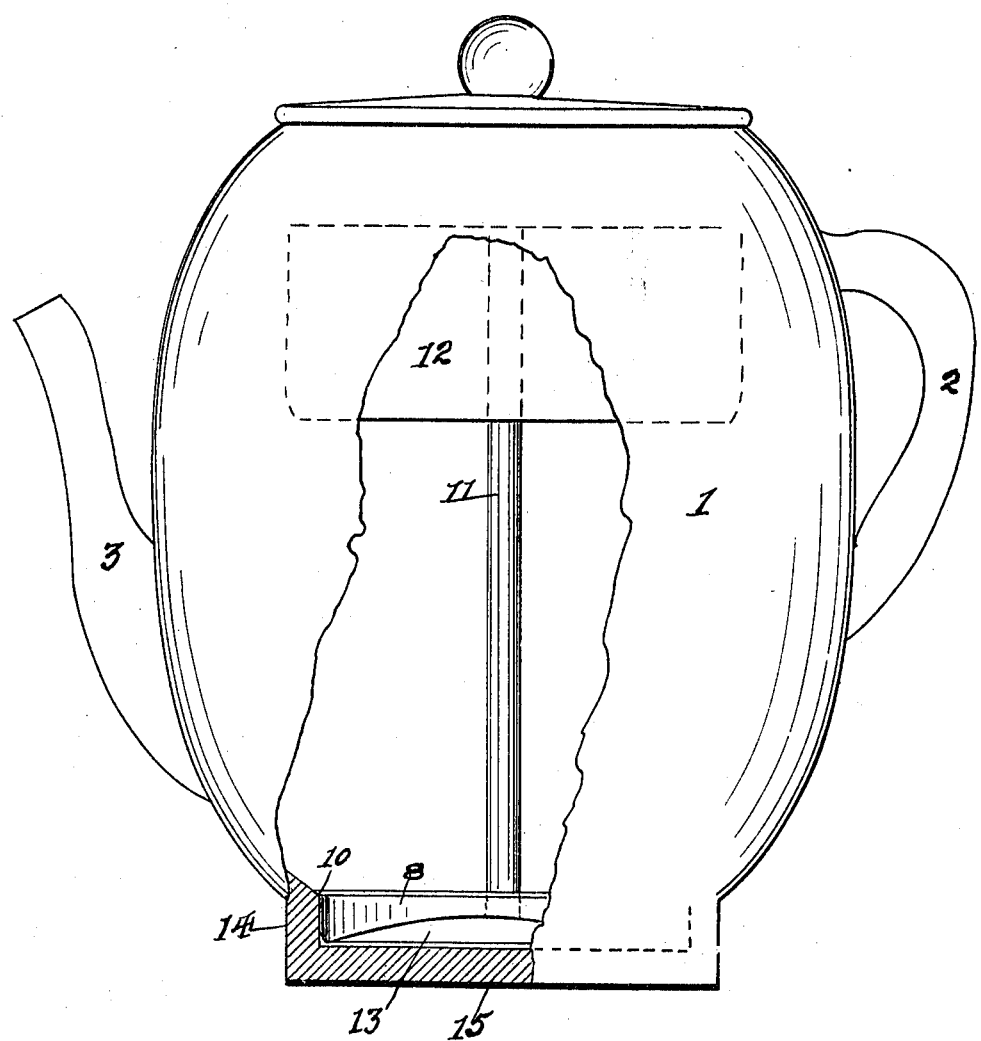

UNITED STATES PATENT OFFICE.

HAROLD C. JOHNSON, OF CHICAGO, ILLINOIS.

COFFEE-PERCOLATOR.

988,470. Specification of Letters Patent. Patented Apr. 4, 1911.

Application filed July 25, 1907, Serial No. 385,410. Renewed August 19, 1910. Serial No. 577,994.

*To all whom it may concern:*

Be it known that I, HAROLD C. JOHNSON, a citizen of the United States, residing at Chicago, in the county of Cook and State of Illinois, have invented a certain new and useful Coffee-Percolator, of which the following is a specification.

My invention is a vessel constructed of pottery which can be placed upon the stove and used to boil liquids in without danger of cracking the vessel.

Heretofore, when a vessel of pottery was placed upon the stove, the sudden expansion caused it to crack. I have discovered that if the side walls which come in contact with the stove are formed relatively thicker than the remaining portion of the vessel, and that if the bottom is formed much thinner than the side walls and preferably concave, that the thin bottom wall will act in the nature of a diaphragm, and, by reason of its flexibility adjust itself to the varying conditions resultant from the unequal expansion caused by the heat.

My invention is primarily designed to construct a vessel which may be used in combination with coffee percolating apparatus, and which will, when so used, percolate in less time than any metal pot, and will continue to percolate for a considerable period of time after removal from the stove.

It has for its further object to provide a vessel for distilling those chemicals which, by reason of their inherent qualities, will corrode any but the most expensive metals, such as gold, platinum, etc., as the glazed pottery affords an ideal surface for such work and will stand the heat much better than glass.

My means of attaining the foregoing objects may be more readily understood by having reference to the accompanying drawings, which are hereunto annexed and are a part of this specification, in which, Figure 1 is a side elevation of a vessel constructed in accordance with my invention, having a part of the side broken away to show the interior. Fig. 2 shows a modified form of construction.

Similar reference numerals refer to similar parts throughout the entire description.

For the purpose of showing the invention reduced to concrete form, I have illustrated a coffee percolating apparatus, but it will be apparent that my invention may be used in a number of shapes and for different purposes, all of which fall properly within the scope of my invention.

In the drawings, the vessel is shown as a coffee pot the body being indicated by the numeral 1. This body is provided with a suitable handle 2 and a spout 3, the body 1 being formed of pottery which is vitrified and then glazed, and the bottom of which is provided with a recess 4 which is surrounded by a wall 5. This wall is shown as an ogee shape, though it is obvious it may be straight if desired. The lower portion 6 is formed considerably thicker than the remaining part of the wall of the body 1. This thickened portion extends around the bottom 7 of the body 1. The bottom 7 may be slightly concave to provide an air chamber between the lid of the stove and the exterior face of the bottom wall so that only the lower portion of the wall 5 is brought into actual contact with the stove.

It is a recognized law of physics that the fluid at the bottom of a receptacle, which fluid is being boiled, is but one degree, or a slight portion of a degree, higher than the boiling point. Obviously, if it were greater, the fluid would burst into steam. It results from this law that by making the bottom wall 7 concave so as to keep it from direct contact with the stove, the temperature of it is a very few degrees, if any, higher than the boiling point; while, constructing it thus permits the bottom wall 7 to either raise or lower itself, its position being determined by the degree of heat to which the side wall 5 has been raised and the degree which it has correspondingly expanded, which will be more or less according to the intensity of the heat to which it is subjected, while, by reason of the thinness of the bottom wall 7, it affords ready and easy transmission of the heat units from the stove to the liquid in the interior of the vessel; while the thickened wall 5, which comes in contact with the stove, is of sufficient mass to resist the action of the heat, even though constructed of a fine grade of pottery.

Within the recess 4, in the interior of the body 1, I locate a member 8, which is provided with flanges 9 and a rim 10, the latter being adapted to extend over the edges of the recess 4. Another difficulty which presents itself to the construction of a vessel for this use of pottery has been due to the fact that the recesses are uneven in size and, as a consequence, the member 8, which is preferably formed of metal, could not be constructed so as to satisfactorily operate because of the extreme variation in the size of the recess 4. It will be apparent that I avoid this difficulty by reason of the extension of the rim 10, it contacting with the inner wall of the body beyond the edge of the recess, so that if the rim 10 is constructed of sufficient size, it does not matter if the cup-shaped member is considerably smaller than the recess, thus permitting it to be used in all of the different pots.

A tube 11 is secured to the member 8; the upper portion of the tube being formed into a basket 12, the side and bottom of which may be perforated, and which is adapted to hold the coffee or whatever article is to be distilled, the tube and receptacle being formed integral.

For some uses it may be found desirable to construct the pot as shown in the modified form illustrated in Fig. 2 of the drawings, where it is desired to percolate a larger amount of coffee, and where it is desirable to retain the heat in the walls of the vessel for a longer period of time. In this form, the bottom is constructed with a recess 13, the side walls 14 of which are uniform in thickness, the bottom 15 may be if desired relatively thinner than the side walls and is constructed so as to come in contact with the lid of the stove. This construction may be found cheaper in practice to manufacture, while the difference in thickness permits the bottom to adjust itself to the expansion of the side walls, it being obvious that the larger mass of pottery will take a longer time to cool after the vessel is removed from the stove.

In operation as a coffee percolator, ground coffee is placed within the basket and water is put into the body of the pot, not sufficient, however, to reach the perforated sides of the basket 12. The cover is then placed upon the vessel and it is set upon the lid of the stove. The heat, passing through the thin bottom wall 7, boils the water in the recess 4, causing it to pass up the interior of the tube 11, from the top of which it escapes, falling into the basket, where it comes in contact with the coffee. It drops through the perforated sides, drawing the extract from the coffee, thus within a very short time transforming the water into drip coffee, which is free from grounds, it being obvious that they will be retained by the basket 12.

Having described my invention, what I regard as new, and desire to secure by Letters Patent, is:

1. In a device of the character described, the combination with a vessel made of pottery having a recess in the lower portion thereof, the side walls of the said recess being relatively thicker than the remaining walls of the body portion, said recess walls being joined by a bottom wall relatively thinner than the side walls, percolating apparatus located within the said recess, said apparatus being provided with a flange and a rim, the said rim extending over and beyond the edges of the recess.

2. In a device of the character described, the combination with a vessel made of pottery having a recess in the lower portion thereof, the side walls of the said recess being relatively thicker than the remaining walls of the body portion, said recess walls being joined by a concave bottom wall relatively thinner than the side walls, percolating apparatus located within the said recess, said apparatus being provided with a flange and a rim, the said rim extending over and beyond the edges of the recess.

HAROLD C. JOHNSON.

Witnesses:
A. NELSON,
H. L. DODSON.